United States Patent
Xu et al.

(10) Patent No.: US 11,596,906 B2
(45) Date of Patent: Mar. 7, 2023

(54) UIO-66-NH₂ DOPED ORGANOSILICON HIGH SALINITY WASTEWATER TREATMENT MEMBRANE AND A PREPARATION METHOD THEREOF

(71) Applicant: Changzhou University, Changzhou (CN)

(72) Inventors: Rong Xu, Changzhou (CN); Qian Liu, Changzhou (CN); Chunhui Zhu, Changzhou (CN); Jing Zhong, Changzhou (CN); Xiuxiu Ren, Changzhou (CN); Min Shen, Changzhou (CN); Yihan Zhang, Changzhou (CN)

(73) Assignee: Changzhou University, Changzhou (CN)

( * ) Notice: Subject to any disclaimer, the term of this patent is extended or adjusted under 35 U.S.C. 154(b) by 172 days.

(21) Appl. No.: 17/165,966

(22) Filed: Feb. 3, 2021

(65) Prior Publication Data

US 2021/0260535 A1 Aug. 26, 2021

(30) Foreign Application Priority Data

Feb. 25, 2020 (CN) .......................... 202010115058.6

(51) Int. Cl.
*B01D 71/06* (2006.01)
*B01D 67/00* (2006.01)

(52) U.S. Cl.
CPC .......... *B01D 71/06* (2013.01); *B01D 67/0076* (2013.01); *B01D 2221/00* (2013.01); *B01D 2323/46* (2013.01)

(58) Field of Classification Search
None
See application file for complete search history.

(56) References Cited

FOREIGN PATENT DOCUMENTS

CN 110711499 B * 9/2021 .......... B01D 67/0079

OTHER PUBLICATIONS

Jinag et al "A new UiO-66-NH2 based mixed-matrix membranes with high CO2/CH4 separation performance", Microporous and Mesoporous Materials 274 (2019) 203-211 (Year: 2019).*

(Continued)

*Primary Examiner* — Krishnan S Menon
(74) *Attorney, Agent, or Firm* — Idea Intellectual Limited; Margaret A. Burke; Sam T. Yip

(57) ABSTRACT

The invention belongs to the technical field of composite membrane, and in particular discloses a UIO-66-NH₂ doped organosilicon high salinity wastewater treatment membrane and a preparation method thereof. The membrane is formed into UIO-66-NH₂/organosilicon hybrid membrane on the prefabricated ceramic support surface through the dip-coating method by doping the UIO-66-NH₂ metal-organic framework material into the organosilicon polymeric sol. The UIO-66-NH₂/organosilicon hybrid membrane prepared by the present invention exhibits high water permeability (up to $1.6 \times 10^{-10}$ m³/(m² s Pa) and high salt retention (NaCl retention rate is more than 99.9. %) in the application of pervaporation desalination, and maintains stable membrane structure in the treatment process of TDS>5 wt % high salinity wastewater.

9 Claims, 4 Drawing Sheets

(56) References Cited

OTHER PUBLICATIONS

Wan etal "Synthesis of highly stable UiO-66-NH2 membranes with high 10ns rejection for seawater desalination" Microporous and Mesoporous Materials 252 (2017) 207- 213 (Year: 2017).*

* cited by examiner

US 11,596,906 B2

UIO-66-NH$_2$ DOPED ORGANOSILICON HIGH SALINITY WASTEWATER TREATMENT MEMBRANE AND A PREPARATION METHOD THEREOF

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims priority to Chinese patent application No. 2020101150586 filed on Feb. 25, 2020, and the disclosure of which is incorporated herein by reference in its entirety.

FIELD OF THE INVENTION

The invention belongs to the technical field of composite membrane, in particular relates to a preparation method of organic-inorganic hybrid composite membrane constructed by metal-organic framework materials, and especially refers to a UIO-66-NH$_2$ doped organosilicon high salinity wastewater treatment membrane and a preparation method thereof.

BACKGROUND OF THE INVENTION

The key to zero liquid discharge lies in how to dispose of large amount of high salinity wastewater produced by industrial activities such as fossil energy exploitation, power plant desulfurization and seawater desalination. The reverse osmosis (RO) desalination technology based on membrane separation has become the most dominating technology in the filed of seawater desalination. However, with the increase of feed salt concentration, the energy consumption of RO desalination process will increase significantly, which limits the application thereof in the field of high salinity wastewater treatment. In recent years, the use of pervaporation (PV) technology for desalination has received widespread concern from researchers. Compared with RO desalination, the PV process has lower requirements on feed water quality, and shows little fluctuation in energy consumption with the increase of feed salt concentration, therefore the PV process can be used for treatment of high-concentration brine. In addition, the operating temperature of PV process is generally 40-90 DEG C, combined with heat recovery and utilization, the energy consumption of PV desalination is comparable to that of RO. By taking these unique advantages, PV is expected to be one of the most promising membrane desalination technologies to solve the current problem of high salinity wastewater treatment.

Recently, it is reported that several types of membrane materials have been applied for PV desalination, mainly including polyvinyl alcohol (PVA), zeolite (NaA, ZSM-5 and silicalite) and silicone materials. However, they have presented low membrane permeability or poor membrane stability in the desalination process of high salinity wastewater. For example, Chinese Patent CA 106110909 A proposes a method for preparing an organic silicon membrane and an application in pervaporation treatment of high salinity wastewater thereof, wherein an organic silicon membrane is prepared using a sol-gel process, which presents good hydrothermal stability in the pervaporation desalination process. However, the organic silicone membrane has very low water permeability, and the concentration range of desalination is limited wt %).

UiO-66-NH$_2$ is a Zr metal-centered rigid metal-organic framework material (Zr-MOF s). Due to strong Zr—O bond in the structure, UiO-66-NH$_2$ is one of the few MOF materials with excellent stability in water environment, and has broad application prospects in the field of water treatment. Furthermore, the pore size of UiO-66 falls just between the size of water molecule (approximately 0.27 nm) and the size of hydrated salt ion (>0.66 nm), and the perfect retention of salt ion can be achieved in theory during the process of desalination application. However, it is difficult to prepare complete and non-defective UiO-66-NH$_2$ molecular separation membrane in a large area due to poor membrane-forming property of UiO-66-NH$_2$ material.

SUMMARY OF THE INVENTION

In view of the shortcomings of the organosilicon pervaporation membrane for current high salinity wastewater treatment such as low water permeability and narrow application range of salt concentration, the present invention provides a method of preparing the pervaporation high salinity wastewater treatment membrane with high water permeability and high salt retention by doping the UiO-66-NH$_2$ nano particles into the bridged organosilicon network and optimizing the structure and surface properties of the bridged organosilicon network by taking advantages of UiO-66-NH$_2$ specific porous structure and high hydrophilicity. The wastewater treatment membrane thereof is formed into UiO-66-NH$_2$/organosilicon hybrid membrane on the prefabricated ceramic support surface through the dip-coating method by doping the UiO-66-NH$_2$ metal-organic framework material into the organosilicon polymeric sol.

The technical solution of the present invention to achieve the above-mentioned purpose is as follows:

A preparation method of UiO-66-NH$_2$ doped organosilicon high salinity wastewater treatment membrane, wherein the specific steps are as follows:

(1) 1,2-Bis(triethoxysilyl)ethylene (BTESEthy) (as silicon source precursor) and hydrochloric acid (as catalyst) are hydrolyzed and polymerized with water in ethanol solution to obtain the organosilicon polymeric sol.

Wherein, the molar ratio of silicon source precursor, water and hydrochloric acid is 1:60:0.2, and the solution is subjected to agitation at 40 DEG C for 2 h for polymerization reaction.

(2) ZrCl$_4$ and 2-amino-1,4-benzenedicarboxylic acid are dissolved in N,N-dimethylformamide and subjected to ultrasonic agitation for 10 min, then the acetic acid is added and subjected to ultrasonic agitation for 10 min (the molar ratio of ZrCl$_4$, BDC-NH$_2$, HAC and DMF is 1:1:50:500). The mixture is put into the preheated 130 DEG C oven for 24 h. Finally, the product UiO-66-NH$_2$ is washed with N,N-dimethylformamide and methanol, and dried overnight at 100 DEG C to obtain the UiO-66-NH$_2$ crystal.

(3) The UiO-66-NH$_2$ crystal is added into the organosilicon polymeric sol and subjected to ultrasonic mixing and uniform dispersion for 30 min to prepare the UiO NH$_2$/organosilicon hybrid sol. The UiO-66-NH$_2$/organosilicon sample of different composition is designated as UB-n (n=0.2, 0.5, 0.8 or 1) to indicate the weight ratio of UiO-66-NH$_2$ and organosilicon in solution.

(4) The UiO-66-NH$_2$/organosilicon hybrid sol is coated on the α-Al$_2$O$_3$ ceramic support of the silica-zirconia nanometer transition layer through the dip-coating method, and then is flash burned in air at 250 DEG C for 20 min to obtain the UiO-66-NH$_2$/organosilicon hybrid membrane.

Wherein, the ceramic support comprising the silica-zirconia transition layer is soaked in the silica-zirconia sol for 10-60 s, and then dried at room temperature for 5-10 min and calcined for 15-30 min. The calcination temperature is 500-600 DEG C, and the calcination atmosphere is air. The process is repeated 2-3 times. For preparation process of the silica-zirconia sol, reference is made to Chinese Patent CN105272370A of our research group.

The separation performance of the membrane prepared by the present invention is subjected to evaluation of two indexes: permeation flux (JO and apparent retention rate ($R_{obs}$). The permeation flux and the apparent retention rate of the membrane can be obtained through corresponding calculations.

The calculation formula of permeation flux is as follows:

$$J_i = \frac{P_i}{1}(p_{io} - p_{i1}) \quad (1)$$

(Where, l is the thickness of the membrane; $p_{io}$ and $p_{il}$ are the partial pressure of the component i on the raw material side and the permeation side of the membrane respectively; $P_i$ is the permeability of the membrane).

The calculation formula of apparent retention rate is as follows:

$$R_{obs} = \left(1 - \frac{C_P}{C_f}\right) \times 100\% \quad (2)$$

(Where, $c_p$ and $c_f$ are the ion concentration of the raw material solution and the permeation solution respectively).

Beneficiary effects of the present invention:

The invention has the advantages of low cost, simple preparation method and high rejection rate (NaCl rejection rate is up to 99.9%). With the increase of operating temperature, the water flux increases, and the rejection rate is less sensitive to the operating temperature. The membrane is characterized with good hydrophilicity and pore size distribution, and is applicable to the treatment of brine with a wide range of salt concentration. Meanwhile, the membrane exhibits good hydrothermal stability. For the energy consumption required for pervaporation, that is, the raw material at the front side of the membrane needs to be heated, the waste heat, solar energy and other low heat energy can be utilized for pervaporation, which reduces the external energy consumption of the process. Moreover, the energy consumption of the membrane prepared by the present invention is barely affected by the salt concentration.

The invention provides a method of doping UiO-66-NH$_2$ into BTESEthy and modifying the network structure of the BTESEthy membrane to improve the hydrophilicity of the membrane. The reason of selecting the amine-functionalized UiO-66 (UiO-66-NH$_2$) MOFs as nanometer membrane is that the introduced amine groups can serve as hydrophilic sites for subsequent water adsorption, which enhances the transport of water molecules through the hybrid membrane, and the introduction of UiO-66-NH$_2$ provides channels for water molecules to pass through the membrane quickly and orderly. Moreover, the narrow pore size of UiO-66-NH$_2$ only provides transport channels for water molecules but not for hydrated salt ions, therefore the membrane is characterized with high salt retention in the process of PV desalination.

DETAILED DESCRIPTION

Figure 1:
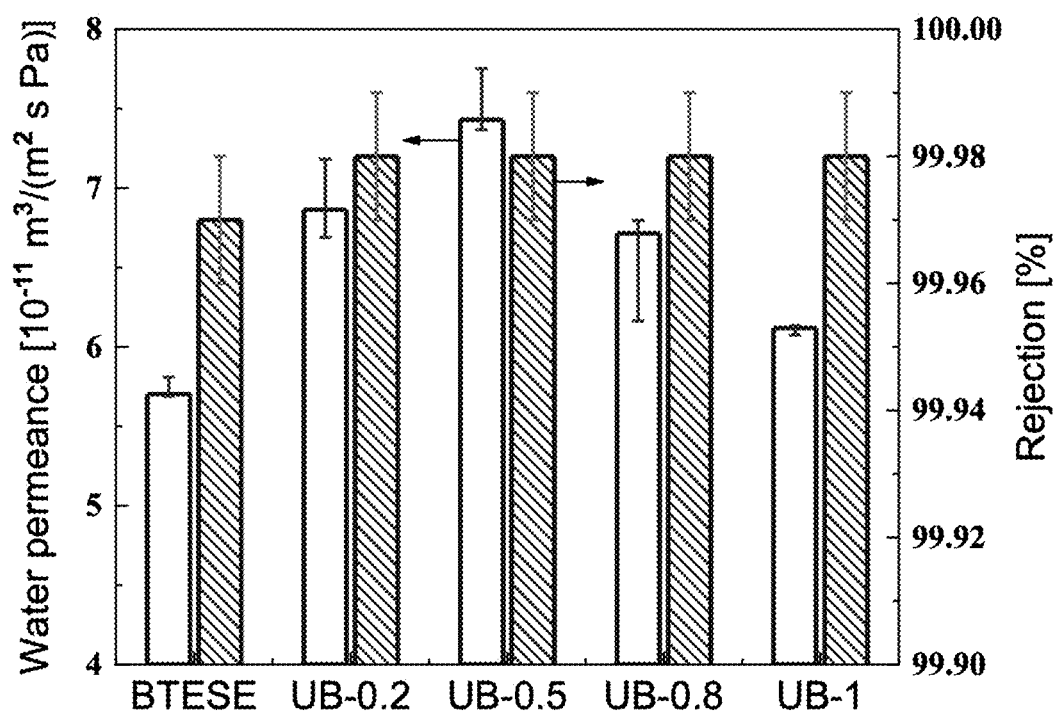
FIG. 1 depicts the water flux and the salt retention rate of BTESEthy membrane and UiO-66-NH$_2$BTESEthy composite membrane in 6.5 wt % NaCl solution at 70° C.
Figure 2:
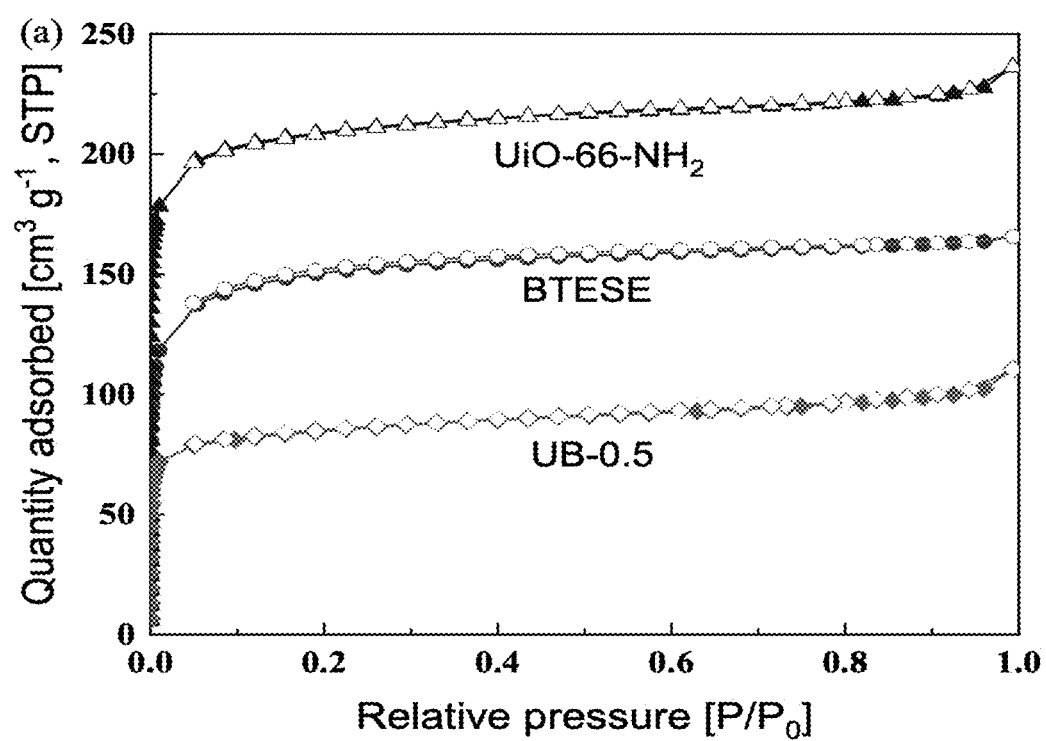
FIG. 2 depicts the isothermal curves of nitrogen adsorption for BTESEthy, UiO-66-NH$_2$/BTESEthy and UB-0.5 membranes.
Figure 3A:
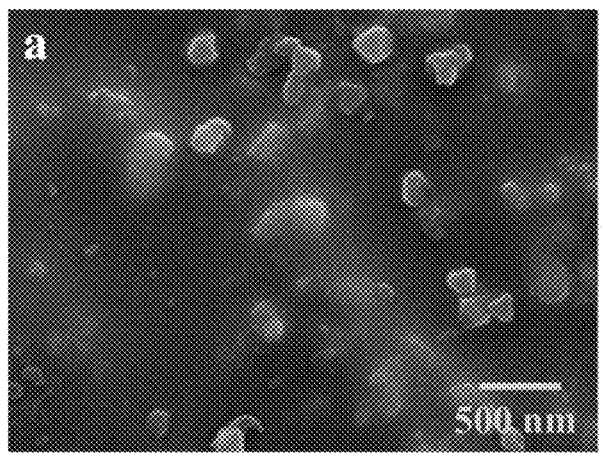
FIG. 3A depicts the SEM images of top view for UB-0.5 membrane.
Figure 3B:
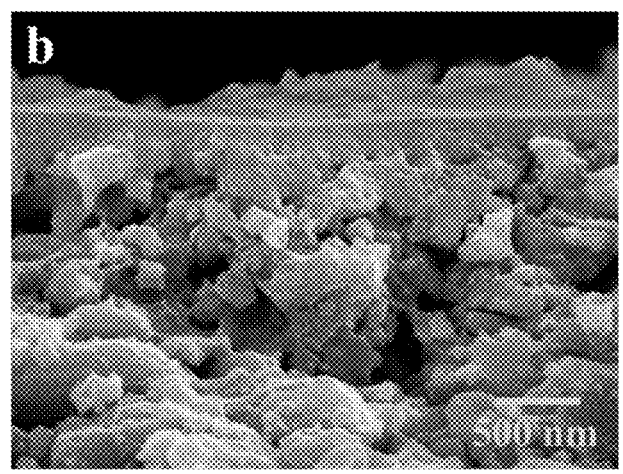
FIG. 3B depicts the SEM images of cross-section view for UB-0.5 membrane.
Figure 4:
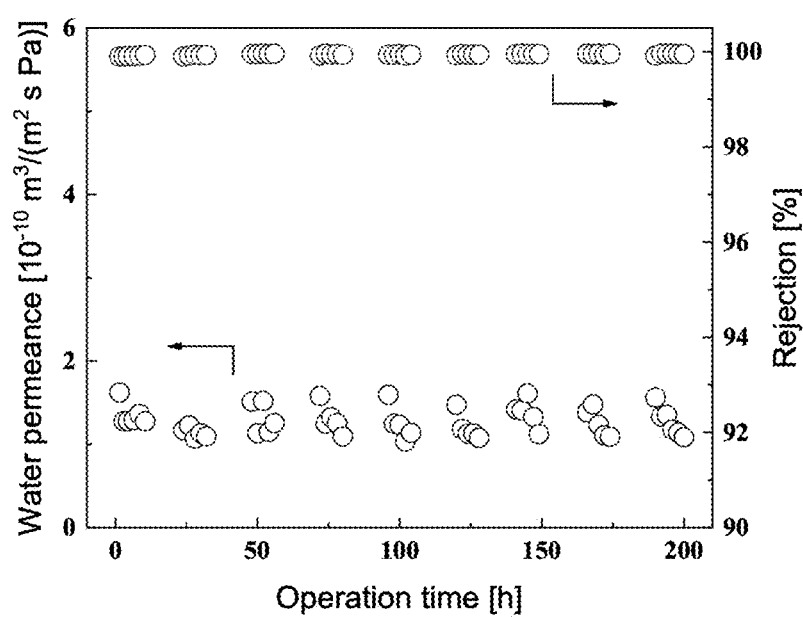
FIG. 4 depicts the desalination hydrothermal stability test of UB-0.5 membrane.

The present invention further illustrates the technical features of the present invention by combining the following embodiments, but the protection scope of the present invention is not limited to the embodiments.

Embodiment 1

The preparation method for the embodiment is as follows, including the following steps:

(1) 1,2-Bis(triethoxysilyl) ethylene (BTESEthy) (as silicon source precursor) and hydrochloric acid (as catalyst) are hydrolyzed and polymerized with water in ethanol solution. The molar ratio of BTESEthy, water and hydrochloric acid is 1:60:0.2, and the solution is subjected to agitation at 40° C. for 2 h to obtain the BTESEthy polymeric sol.

(2) ZrCl$_4$ and 2-amino-1,4-benzenedicarboxylic acid are dissolved in N,N-dimethylformamide and subjected to ultrasonic agitation for 10 min, then the acetic acid is added and subjected to ultrasonic agitation for 10 min (the molar ratio of ZrCl$_4$, BDC-NH$_2$, HAC and DMF is 1:1:50:500). The mixture is put into the preheated 130 DEG C oven for 24 h. Finally, the product UiO-66-NH$_2$ is washed with N,N-dimethylformamide and methanol, and dried overnight at 100 DEG C to obtain the UiO-66-NH$_2$ crystal.

(3) The UiO-66-NH$_2$ crystal is added into the BTESEthy polymeric sol and subjected to ultrasonic mixing and uniform dispersion for 30 min to prepare the UiO-66-NH$_2$/BTESEthy hybrid sol. The UiO-66-NH$_2$/BTESEthy sample of different composition is designated as UB-n (n=0.2, 0.5, 0.8 or 1) to indicate the weight ratio of UiO-66-NH$_2$ and BTESEthy in solution.

(4) The UiO-66-NH$_2$/BTESEthy hybrid sol is coated on the α-Al$_2$O$_3$ ceramic support comprising the silica-zirconia nanometer transition layer through the dip-coating method, wherein the ceramic support comprising the silica-zirconia transition layer is soaked in the silica-zirconia sol for 40 s, and then dried at room temperature for 7 min and calcined for 20 min. The calcination temperature is 500 DEG C, and the calcination atmosphere is air. The process is repeated 2-3 times. After coating, the flash burning is carried out in air at 250 DEG C for 20 min to obtain the UiO-66-NH$_2$/BTESEthy hybrid membrane. The membrane prepared is applied to the pervaporation desalination system.

Embodiment 2

The preparation method for the embodiment is as follows, including the following steps:

(1) 1,2-Bis(triethoxysilyl)ethylene (BTESEthy) (as silicon source precursor) and hydrochloric acid (as catalyst) are hydrolyzed and polymerized with water in ethanol solution. The molar ratio of BTESEthy, water and hydrochloric acid is 1:60:0.2, and the solution is subjected to agitation at 40° C. for 2 h to obtain the BTESEthy polymeric sol.

(2) $ZrCl_4$ and 2-amino-1,4-benzenedicarboxylic acid are dissolved in N,N-dimethylformamide and subjected to ultrasonic agitation for 10 min, then the acetic acid is added and subjected to ultrasonic agitation for 10 min (the molar ratio of $ZrCl_4$, BDC-$NH_2$, HAC and DMF is 1:1:50:500). The mixture is put into the preheated 130 DEG C oven for 24 h. Finally, the product UiO-66-$NH_2$ is washed with N,N-dimethylformamide and methanol, and dried overnight at 100 DEG C to obtain the UiO-66-$NH_2$ crystal.

(3) The UiO-66-$NH_2$ crystal is added into the BTESEthy polymeric sol and subjected to ultrasonic mixing and uniform dispersion for 30 min to prepare the UiO-66-$NH_2$/BTESEthy hybrid sol. The UiO-66-$NH_2$/BTESEthy sample of different composition is designated as UB-n (n=0.2, 0.5, 0.8 or 1) to indicate the weight ratio of UiO-66-$NH_2$ and BTESEthy in solution.

(4) The UiO-66-$NH_2$/BTESEthy hybrid sol is coated on the $\alpha$-$Al_2O_3$ ceramic support comprising the silica-zirconia nanometer transition layer through the dip-coating method, wherein the ceramic support comprising the transition layer is soaked in the silica-zirconia sol for 40 s, and then dried at room temperature for 7 min and calcined for 20 min. The calcination temperature is 500 DEG C, and the calcination atmosphere is air. The process is repeated 2-3 times. After coating, the flash burning is carried out in air at 250 DEG C for 20 min to obtain the UiO-66-$NH_2$/BTESEthy hybrid membrane. The membrane prepared is applied to the pervaporation desalination system.

Comparative 1

(1) 1,2-Bis(triethoxysilyl)ethane (BTESEthy) (as silicon source precursor) and hydrochloric acid (as catalyst) are hydrolyzed and polymerized with water in ethanol solution. The molar ratio of BTESEthy, water and hydrochloric acid is 1:60:0.2, and the solution is subjected to agitation at 40° C. for 2 h to obtain the BTESEthy polymeric sol.

(2) The BTESEthy sol is coated on the $\alpha$-$Al_2O_3$ ceramic support comprising the silica-zirconia nanometer transition layer through the dip-coating method, wherein the ceramic support comprising the transition layer is soaked in the silica-zirconia sol for 40 s, and then dried at room temperature for 7 min and calcined for 20 min. The calcination temperature is 500 DEG C, and the calcination atmosphere is air. The process is repeated 2-3 times. After coating, the flash burning is carried out in air at 250 DEG C for 20 min to obtain the BTESEthy membrane. The membrane prepared is applied to the pervaporation desalination system.

Comparative 2

(1) 1,2-Bis(triethoxysilyl)ethane (BTESEthy) (as silicon source precursor) and hydrochloric acid (as catalyst) are hydrolyzed and polymerized with water in ethanol solution. The molar ratio of BTESEthy, water and hydrochloric acid is 1:60:0.2, and the solution is subjected to agitation at 40° C. for 2 h to obtain the BTESEthy polymeric sol.

(2) The 0.160 $ZrCl_4$ and the 0.124 g 2-amino-1,4-benzenedicarboxylic acid are dissolved in 10 mL N,N-dimethylformamide and subjected to ultrasonic agitation for 10 min, then 2 mL acetic acid is added and subjected to ultrasonic agitation for 10 min (the molar ratio of $ZrCl_4$, $H_2$BDC, HAC and DMF is 1:1:50:500). The mixture is put into the preheated 130 DEG C oven for 24 h. Finally, the product UiO-66 is washed with N,N-dimethylformamide and methanol, and dried overnight at 100 DEG C to obtain the UiO-66 crystal.

(3) The UiO-66 crystal is added into the BTESEthy polymeric sol and subjected to ultrasonic mixing and uniform dispersion for 30 min to prepare the UiO-66/BTESEthy hybrid sol. The weight ratio of UiO-66 and BTESEthy is 0.5.

(4) The UiO-66/BTESEthy hybrid sol is coated on the $\alpha$-$Al_2O_3$ ceramic support comprising the silica-zirconia nanometer transition layer through the dip-coating method, wherein the ceramic support comprising the transition layer is soaked in the silica-zirconia sol for 40 s, and then dried at room temperature for 7 min and calcined for 20 min. The calcination temperature is 500 DEG C, and the calcination atmosphere is air. The process is repeated 2-3 times. After coating, the flash burning is carried out in air at 250 DEG C for 20 min to obtain the UiO-66/BTESEthy hybrid membrane. The membrane prepared is applied to the pervaporation desalination system.

The experimental results of above embodiments and comparatives are shown in Table 1.

TABLE 1

| Membrane | Flux $10^{-11}$ $m^3/(m^2 \, s \, Pa)$ | Retention rate (%) |
| --- | --- | --- |
| Embodiment 1 | 7.4 | 99.98 |
| Embodiment 2 | 7.3 | 99.98 |
| Comparative 1 | 5.7 | 99.97 |
| Comparative 2 | 6.1 | 99.98 |

What is claimed is:

1. A method of preparing a UiO-66-$NH_2$ doped organosilicon high salinity wastewater treatment membrane, the method comprising steps of:
   (1) hydrolyzing and polymerizing a silicon source precursor and a hydrochloric acid catalyst with water in ethanol solution to obtain an organosilicon polymeric sol;
   (2) adding UiO-66-$NH_2$ crystal into the organosilicon polymeric sol by ultrasonic mixing and uniform dispersion to prepare a UiO-66-$NH_2$/organosilicon hybrid sol;
   (3) dip-coating the UiO-66-$NH_2$/organosilicon hybrid sol on a ceramic support of a silica-zirconia nanometer transition layer; and
   (4) flash-burning the dip-coated UiO-66-$NH_2$/organosilicon hybrid sol in air to obtain the UiO-66-$NH_2$ doped organosilicon high salinity wastewater treatment membrane.

2. The method of claim 1, wherein the silicon source precursor according to the step (1) is 1,2-Bis(triethoxysilyl)ethylene, abbreviated as BTESEthy.

3. The method of claim 1,
   wherein the silicon source precursor, the water and the hydrochloric acid catalyst according to the step (1) are having a molar ratio of 1:60:0.2;
   wherein a hydrolytic-polymeric reaction temperature according to the step (1) is 40 DEG C; and
   wherein a hydrolytic-polymeric reaction time according to the step (1) is 2 h.

4. The method of claim 1,
   wherein the step (2) comprises is:
       dissolving $ZrCl_4$ and 2-amino-1,4-benzenedicarboxylic acid in N,N-dimethylformamide (DMF) resulting in a first mixture and subjecting the first mixture to ultrasonic agitation for 10 min;

adding acetic acid to the first mixture resulting in a second mixture and subjecting the second mixture to ultrasonic agitation for 10 min;

putting the second mixture into a preheated 130 DEG C oven for 24 h resulting in a product UiO-66-$NH_2$;

washing the product UiO-66-$NH_2$ with N,N-dimethylformamide and methanol; and drying the washed product UiO-66-$NH_2$ overnight at 100 DEG C to obtain the UiO-66-$NH_2$ crystal;

wherein molar ratio of $ZrCl_4$, BDC-$NH_2$, HAC and DMF is 1:1:50:500.

5. The method of claim 1, wherein weight ratio (UB-n) of UiO-66-$NH_2$ and organosilicon in the hybrid sol according to the step (2) is 0.2-1.

6. The method of claim 1, wherein the ultrasonic mixing duration according to the step (2) is 30 min.

7. The method of claim 1, wherein the ceramic support according to the step (3) is a α-$Al_2O_3$ ceramic membrane.

8. The method of claim 1, wherein the step (3) comprises:

soaking the ceramic support of the silica-zirconia nanometer transition layer in a silica-zirconia sol for 10-60 s;

drying the soaked ceramic support at room temperature for 5-10 min; and calcining the dried ceramic support in air for 15-30 min at a temperature of 500-600 DEG C under air atmosphere; and repeating the calcination 2-3 times.

9. The method of claim 1, wherein the flash-burning temperature according to the step (3) is 250 DEG C; and the flash-burning time according to the step (3) is 20 min.

* * * * *